3,652,615
PLATINUM COMPLEXES

Nicou Parasko, Lyon, France, assignor to Rhone-Poulenc S.A., Paris, France

No Drawing. Original application Mar. 14, 1968, Ser. No. 712,961, now Patent No. 3,522,327, dated July 28, 1970. Divided and this application Dec. 24, 1969, Ser. No. 889,837

Claims priority, application France, Mar. 29, 1967, 100,664

Int. Cl. C07f 15/00

U.S. Cl. 260—429 R   4 Claims

ABSTRACT OF THE DISCLOSURE

The invention provides new complexes of platinous chloride with triaminophosphines which are useful as catalysts for promoting the reaction between alkenyl groups and hydrogen attached to silicon e.g. in curable organopolysiloxane compositions.

---

This application is a division of application Ser. No. 712,961, filed March 14, 1968, now Patent No. 3,522,327, issued July 28, 1970.

This invention relates to platinum complexes and their use in curing organopolysiloxane compositions.

Complexes of platinous chloride with organic phosphorus compounds have already been described, having the formula:

$$PtCl_2 \cdot [PA_3]_2$$

in which A represents an ethyl, propyl, butyl or phenyl radical [Jensen Z. Anorg. Chem. 229, 225 (1936)].

In French Pat. No. 1,384,429, it has been proposed to catalyze the addition between a polysiloxane containing Si-H bonds and a polysiloxane containing alkenyl groups with a compound of the formula:

$$PtCl_2 \cdot [PB_3]_2$$

in which the symbol B represents a hydrocarbon radical or an alkoxy, cycloalkoxy or phenyloxy group.

The present invention provides platinous chloride complexes of the formula:

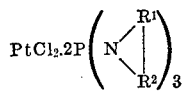

in which $R^1$ and $R^2$ are the same or different unsubstituted or inertly substituted hydrocarbon groups which may be linked to form a heterocyclic radical. (By "inertly" substituted is meant substituted by radicals which do not react with platinous chloride.)

When two of the radicals $R^1$ and $R^2$ are associated to form a divalent hydrocarbon radical, they may form either a monovalent heterocyclic radical with a nitrogen atom or a heterocycle with the phosphorus atom and two of the nitrogen atoms attached thereto. More particularly $R^1$ and $R^2$ may represent lower alkyl (i.e. alkyl of 1 to 4 carbon atoms), lower alkenyl (i.e. alkenyl having a single double bond and from 2 to 4 carbon atoms), more particularly vinyl or allyl, an alicyclic radical of 5 or 6 ring carbon atoms, such as cyclopentyl, cyclohexyl, cyclohexenyl, methylcyclopentyl or methylcyclohexyl, an aryl radical such as phenyl or (lower alkyl) phenyl, or an aralkyl radical such as phenyl (lower alkyl), e.g. benzyl. When $R^1$ and $R^2$ form a heterocycle with the nitrogen atom, this heterocycle may be saturated and mononuclear with 5 to 6 links and may contain a second heteroatom. In addition, this heterocycle may optionally have alkyl substituents such as methyl, ethyl or propyl. The residue

may thus be, for example, a pyrrolidino, piperidino, morpholino, monomethylpiperidino, dimethylpiperidino, diethylpiperidino, or 4-methyl-1-piperazinyl residue. When two of the radicals $R^1$ and $R^2$ form a heterocycle with the phosphorus atom and two of the nitrogen atoms attached thereto, the divalent radical represented by $R^1$ and $R^2$ may be a polymethylene or phenylene radical, these radicals optionally carrying alkyl substituents such as methyl, ethyl, or propyl. $R^1$ and $R^2$ are preferably alkyl of 1 to 4 carbon atoms.

The new complexes may be prepared from platinous chloride and an organoaminophosphine of the formula:

in which the symbols $R^1$ and $R^2$ have the meaning given above. These organic triaminophosphines are readily obtainable from phosphorus trichloride and amines, and their preparation is described in the literature, for example in Houben-Weyl's "Methoden der Organischen Chemie." Some of them, such as tris(dimethylamino) phosphine, are readily accessible.

The preparation of the new complexes may be carried out by introducing the platinous chloride into the aminophosphine and then heating the mixture. Since the reaction consists in a simple addition, one molecule of platinous chloride to two molecules of aminophosphine is theoretically required. In practice, it is preferable to employ more than two molecules of aminophosphine; the unreacted excess of aminophosphine may readily be recovered at the end of the operation. The reaction may with advantage be carried out in a diluent, preferably a chlorinated hydrocarbon such as chloroform, methylene chloride, or a chloroethylene.

The temperature at which the reaction takes place generally varies with the aminophosphine employed. With aminophosphines having a low number of carbon atoms, it is generally between 70° and 100° C. The reaction is frequently exothermic, and it is therefore advantageous to control its progress, for example by gradually introducing the platinous chloride into the aminophosphine, which is optionally diluted and brought to the chosen temperature.

The isolation of the complex may thereafter take place by any appropriate means, e.g. precipitation with a non-solvent or evaporation of the excess aminophosphine and any solvent used.

The new complexes may be employed as catalysts for the addition of organosilicon compounds having Si-H bonds onto hydrocarbon groups containing multiple carbon-carbon bonds of aliphatic or alicyclic nature. They are particularly suitable catalysts in organopolysiloxane compositions which are stable in storage up to temperatures of about 40–45° C., but curable by cross-linking at temperatures above 100° C. and which contain at least one organopolysiloxane having Si-H bonds and one organopolysiloxane having alkenyl groupings such as vinyl or alkyl.

The compositions containing as catalyst one of the complexes according to the invention may be kept for a fairly long period of time without undergoing any appreciable modification provided that, under the storage conditions, their temperature remains relatively low. In practice, to ensure long preservation, it is desirable not to exceed 40–

45° C. At a temperature of 25–30° C., these compositions may be kept for several months before being used.

Organopolysiloxanes suitable for use in the above-defined compositions may be of very varied types. The siloxane units of which they are composed may be mono-, di-, tri- or tetra-functional. The silicon atoms belonging to the mono-, di- and tri-functional units may be substituted by very varied hydrocarbon groupings (hereinafter denoted R). The latter include alkyl radicals having from 1 to 4 carbon atoms, saturated alicyclic radicals having from 3 to 6 carbon atoms in the ring, aryl radicals, more particularly phenyl radicals optionally substituted by lower alkyl radicals, and aralkyl radicals, more particularly phenylalkyl radicals, these various hydrocarbon groupings being optionally substituted by halogen atoms such as chlorine or fluorine atoms, or by functional groups, such as cyano. These various organopolysiloxanes may have a cyclic or linear configuration and be oils or non-flowing gums. They may also be oily or resinous cross-linked polysiloxanes.

A single organopolysiloxane molecule may possess both Si-H bonds and alkenyl radicals. However, the invention is more particularly concerned with mixtures of organopolysiloxanes in which the Si-H groups and the alkenyl radicals are attached to different molecules.

The organopolysiloxanes which may be used in the cross-linkable compositions using the new complexes include:

(1) Cyclic organopolysiloxanes of the formula:

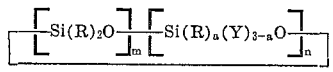

in which the symbol R represents one of the aforesaid hydrocarbon radicals, the symbol Y represents a hydrogen atom or a vinyl radical, $a$ is equal to 0 or 1, $m$ is 0 or an integer at most equal to 6, $n$ is an integer from 2 to 8, and the sum $m+n$ may be 3 to 8. Examples of these cyclic organopolysiloxanes are 1,3,5,7-tetramethylcyclotetrasiloxane, 1,3,5,7,9 - pentamethylcyclopentasiloxane, 1,3,5-triethylcyclotrisiloxane, 1,3,5,7,9 - pentaethylcyclopentasiloxane, 1,3,5-triphenylcyclotrisiloxane, and 1,3,5,7-tetramethyl-1,3,5,7-tetravinylcyclotetrasiloxane.

(2) Linear organopolysiloxanes which may be oils or gums, having at least two siloxane units and of the formula:

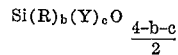

in which $b$ is 0, 1 or 2, and $c$ is 1 or 2, the sum $b+c$ being 2 or 3, and the symbols R and Y have the same meanings as above, and siloxane units of the formula:

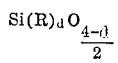

in which $d$ is 2 or 3 and R has the meaning given above.

The preparation of these organopolysiloxanes is described in the literature. For example, they may be obtained by cohydrolysis of mono- and bi-functional silanes. They may also be prepared from cyclic organopolysiloxanes and linear organopolysiloxanes having a small number of silicon atoms which act as chain limiters, by equilibration with catalysts such as sulphuric acid and diorganosilyl sulphates. When the mixture of organopolysiloxanes contains no hydrogen atoms directly attached to silicon atoms, it is also possible to employ alkaline catalysts, such as alkali-metal hydroxides, or preferably alkali metal silanolates.

(3) Cross-linked organopolysiloxanes which may be viscous oils or resinous solids. These organopolysiloxanes contain tetra-functional or tri-functional siloxane units such as $RSiO_{3/2}$ or $YSiO_{3/2}$, in which R and Y have the meanings previously given, associated with mono- or bi-functional units such as those enumerated in the foregoing.

Of the linear or cross-linked organopolysiloxanes, those whose proportion of siloxane units having at least one Si-Y bond does not exceed 50% of the total number of siloxane units are preferred.

An example of a particular composition which may be cured in accordance with the invention to form an elastomer is a composition comprising: a linear diorganopolysiloxane gum having a viscosity from 1 million to 30 million centipoises at 25° C. and comprising from 1 to 10 vinyl radicals to 1000 silicon atoms; an organopolysiloxane having from 5 to 500 silicon atoms and possessing at least two hydrogen atoms directly attached to silicon per molecule, the proportion of hydrogenopolysiloxane being from 0.5% to 20% by weight calculated on the gum; and optionally various fillers and adjuvants, in addition to the new complex.

Another example is liquid organopolysiloxane mixtures which may be converted into elastic gels comprising: a diorganopolysiloxane oil having a viscosity at 25° C. between 100 and 10,000 centipoises and containing 2 to 200 vinyl groups for each 1,000 silicon atoms; a liquid α,ω-dihydrogeno-diorganopolysiloxane having a viscosity at 25° C. less than 2,000 centipoises, the proportion of the hydrogeno-polysiloxane being 0.5 to 25% by weight of the said polysiloxane oil; and optionally various fillers and adjuvants, in addition to the new complex. Mixtures of this type are described in French Pats. Nos. 1,228,518, 1,301,874 and 1,314,679.

The maximum quantity of catalyst employed is not critical. In practice, proportions of the order of 10 mg. to 200 mg. of platinum per gram of hydrogen directly attached to the silicon are suitable.

The following examples illustrate the invention.

EXAMPLE 1

A suspension of 1.87 g. of platinous chloride in 10 cc. of trichloroethylene is gradually introduced in 30 minutes into 25 cc. of tris(dimethylamino)phosphine previously heated to 75° C. The stirring is continued with heating at 75° C. for 15 minutes after the end of the addition of the platinous chloride, and the mixture is then cooled to ambient temperature. The complex formed is precipitated by adding 10 cc. of pentane. After filtration, the isolated complex is purified by dissolution in trichloroethylene followed by reprecipitation with pentane. 3.19 g. of a pale yellow solid which melts at 206° C. are obtained. Elementary analysis shows that this compound may be given the formula: $PtCl_2 \cdot 2P[N(CH_3)_2]_3$. It is soluble in chlorinated solvents such as chloroform, trichloroethylene and tetrachloroethane. It is sparingly soluble in the aromatic hydrocarbons such as benzene and toluene, in dimethylformamide and in tetrahydrofuran.

EXAMPLE 2

A methylvinylpolysiloxane gum is prepared by polymerising a mixture of 1000 g. of octamethylcyclotetrasiloxane, 2.3 g. of tetramethyltetravinylcyclotetrasiloxane and 0.75 g. of tetradecamethylhexasiloxane (chain limiter), this copolymerisation being effected by heating for 4 hours at a temperature of 150° C. in the presence of 0.01 g. of potassium hydroxide. At the end of the polymerisation, the product is neutralised at elevated temperature by the addition of 10 g. of precipitated silica. The gum has one vinyl grouping for each 500 silicon atoms and a viscosity of 15 million centipoises at 25° C.

Into 100 g. of this gum are incorporated, with the aid of a two-roll mixer, 45 g. of silica of cumbustion treated with octamethylcyclotetrasiloxane, 1.75 g. of a dimethyl-(tetramethylethylenedioxy)silane of the formula:

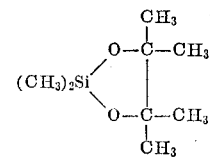

12.4 g. of an α,ω-dihydrogenated-dimethylpolysiloxane oil of the average formula:

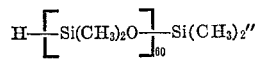

having a viscosity of 120 centipoises at 25° C., and 0.25 cc. of a solution prepared from 0.225 g. of the complex prepared in Example 1 and 25 cc. of trichloroethylene.

One part of the paste obtained is stored. Another part is hardened by heating at 125° C. for 15 minutes under a pressure of 150 kg./cm.² and then for 3 hours at 100° C. in a ventilated oven. The elastomer obtained is then further heated at 250° C. for 16 hours. This elastomer has the following mechanical properties:

Shore A hardness: 65
Breaking strength: 92.5 kg./cm.²
Tearing strength: 21 kg./cm.
Elongation: 425%.

The stored specimen has not undergone any modification at the end of 50 days. This specimen is then hardened to form an elastomer in the manner previously described. The elastomer obtained has the following mechanical properties:

Shore A hardness: 63
Breaking strength: 86 kg./cm.²
Tearing strength: 19 kg./cm.
Elongation: 430%

EXAMPLE 3

The following components are intimately mixed: 1000 g. of an α,ω-bis(trimethylsiloxy)methylvinylpolysiloxane oil having a viscosity of 1297 centipoises at 20° C. and containing 0.3% of vinyl grouping by weight; 120 g. of an α,ω-dihydrogenated dimethylpolysiloxane oil having a viscosity of 29 centipoises at 20° C. and containing 0.066% by weight of hydrogen; and 30 mg. of the complex prepared in Example 1. This mixture is stored and, after 3 weeks, it has not undergone any modification and contains no traces of gelled particles. On heating at 150° C. for 30 minutes it is converted into an elastic gel.

EXAMPLE 4

0.49 g. of platinous chloride are gradually introduced with stirring into 5 cc. of tris(diethylamino)phosphine at ambient temperature, and the mixture is then heated at 110° C. for 45 minutes. After cooling, the excess of tris(diethylamino)phosphine is eliminated by distillation under reduced pressure and the residue is purified by recrystallisation from pentane. 0.98 g. of a pale maroon solid which melts at 210° C. is thus isolated. Elementary analysis shows that this compound may be given the formula: $PtCl_2 \cdot 2P[N(C_2H_5)_2]_3$.

Results similar to those of Example 2 are obtained when catalyst of that example is replaced by 1 cc. of a solution prepared from 0.11 g. of the product of this example and 25 cc. of chloroform.

I claim:
1. A platinous chloride complex of the formula:

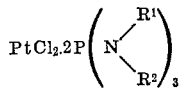

where $R^1$ and $R^2$, which may be the same or different, are each lower alkyl, lower alkenyl, an alicyclic radical of 5 or 6 ring carbon atoms, phenyl, (lower alkyl) phenyl, or phenyl (lower alkyl), or $R^1$ and $R^2$ are linked to form with the adjacent nitrogen a saturated, 5 or 6 membered heterocyclic ring, which may contain a second heteroatom.

2. A complex according to claim 1 in which $R^1$ and $R^2$ are alkyl of 1 to 4 carbon atoms.

3. The complex according to claim 1 of formula:

$$PtCl_2 \cdot 2P[N(CH_3)_2]_3$$

4. The complex according to claim 1 of formula:

$$PtCl_2 \cdot 2P[N(C_2H_5)_2]_3$$

References Cited

Jenkins et al., Inorg. Chem. 6 (1967) p. 2250–5.

JAMES E. POER, Primary Examiner

A. P. DEMERS, Assistant Examiner

U.S. Cl. X.R.

252—429 B, 431 P, 431 N; 260—242, 270 R, 299, 326.8, 313.1